United States Patent [19]

Boyd

[11] 4,034,167
[45] July 5, 1977

[54] TELEPHONE SWITCH RETAINING DEVICE

[76] Inventor: Albert E. Boyd, 2417 Eastline Drive, Joliet, Ill. 60436

[22] Filed: May 24, 1976

[21] Appl. No.: 689,597

[52] U.S. Cl. .............................. 179/178; 179/167; 200/322
[51] Int. Cl.² ......................................... H01H 9/22
[58] Field of Search .......... 179/167, 161, 103, 102, 179/189 R, 178, 158 R; 200/321, 322, 328, 157, 155 A

[56] References Cited

UNITED STATES PATENTS

| | | | |
|---|---|---|---|
| 1,077,225 | 10/1913 | Keith | 179/158 R |
| 2,523,518 | 9/1950 | Rapaport | 200/157 |

FOREIGN PATENTS OR APPLICATIONS

| | | | |
|---|---|---|---|
| 121,676 | 12/1927 | Switzerland | 179/167 |
| 112,102 | 6/1917 | United Kingdom | 179/167 |

Primary Examiner—Thomas W. Brown
Attorney, Agent, or Firm—Ernest Kettelson

[57] ABSTRACT

A telephone switch retaining device comprising an adjustable band surrounding the intermediate portion of a telephone handset of the type having the dial mechanism therein, a depressing member carried on the band in registration with the outwardly biased line connecting switch to depress such switch for disconnection of the line circuit and connection of the signal circuit, and to hold such switch depressed when the band is fastened in place until such time as a signal is transmitted through the signal circuit and it is desired to release the outwardly biased switch for connection of the line circuit. The band may then be adjusted to a releasing position whereby the depressing member moves out of depressing engagement with the outwardly biased switch enabling it to move outwardly to its line connected position.

8 Claims, 9 Drawing Figures

TELEPHONE SWITCH RETAINING DEVICE

BACKGROUND OF THE INVENTION

This invention relates to the field of telephone attachments comprising switch retaining devices. It is specifically directed to such devices for use in telephone ear pieces of the type which include the dialing mechanism, or station selecting mechanism, in the handset.

Such handsets include a line-circuit, signal-circuit switch biased normally in a line-connected, signal-disconnected position. In such position, communication may be transmitted over the completed line circuit and a signal may not be transmitted over the disconnected signal circuit. Biased telephone switches of this type are operably positioned whereby they are moved to the line-disconnect and signal-connect position when the telephone handset is placed or "hung" on some part of the telephone body in a stored or inactive mode. Typically, a bias switch as described is of the push-button type, and mounted on the operable side of the handset whereby it is depressed when that side of the handset is placed face down on a storage cradle of the telephone body. Thus, when the handset is placed on the storage cradle, the switch is depressed and moved to the line-disconnect, signal-connect position. When the phone rings in response to a signal through the connected signal circuit, the handset is lifted from its storage cradle whereupon the biased switch is released and moves to the line-connect, signal-disconnect position. Communication may then be transmitted over the line circuit.

It is desired to use such telephones, and handsets of the type described, in positions remote from the telephone body itself and without the necessity of returning the handset to the cradle when communication is finished. To accomplish such purpose, a means is required to move the biased switch from its normally biased line-connect, signal-disconnect position to its line-disconnect, signal-connect position, and to retain the switch in such position until a signal is transmitted over the connected signal circuit and it is desired to again move the switch to its line-connected, signal-disconnected position.

SUMMARY OF THE INVENTION

It is an object of the invention to provide a switch retaining device for a telephone of the type having a dual function line-circuit, signal-circuit switch mounted in the handset and normally biased toward the line-connect, signal-disconnect position, wherein the said dual function switch may be moved to the line-disconnect, signal-connect position by said device and retained in such position until it is desired to release the switch from such position.

It is an object of the invention to provide a switch retaining device for a telephone of the type having a dual line-circuit, signal-circuit switch and station selecting mechanism mounted in the handset, whereby such telephone may be used both in the communication mode and in the inactive or stored mode at a location remote from the telephone body.

It is an object of the invention to provide a switch retaining device for a telephone of the type having a dual function line-circuit, signal-circuit switch and station selecting mechanism mounted in the handset, including an adjustable band around the intermediate portion of the handset and a depressing member carried on said band in registration with said line-circuit, signal-circuit switch to move it toward its line-disconnect, signal-connect position and retain it in such position when said band is adjustably moved and secured in a first inactive position.

It is an object of the invention to provide a switch retaining device for a telephone of the type having a dual function line-circuit, signal-circuit switch and station selecting mechanism mounted in the handset, including an adjustable band around the intermediate portion of the handset and a depressing member carried on said band in registration with said line-circuit, signal-circuit switch to retain said switch in its line-disconnect, signal-connect position and to release said switch for movement to its line-connect, signal-disconnect position when said band is adjustably moved to a second communication position.

DESCRIPTION OF PREFERRED EMBODIMENT

Figure 1:
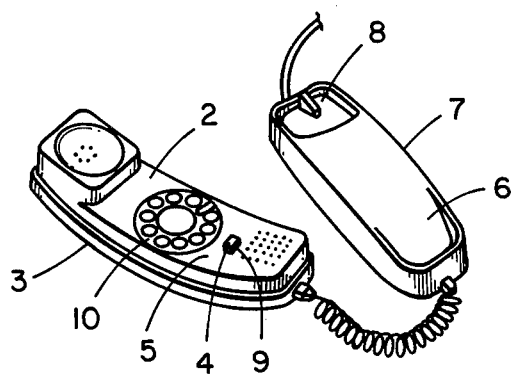
FIG. 1 is a perspective view of a telephone of the type having a dual function line-circuit, signal-circuit switch and station selecting mechanism mounted in the handset, with which the invention disclosed herein is used.

In accordance with this invention, a band 1 is adjustably mounted around the intermediate portion 2 of a telephone ear piece 3. A dual function switch 4 is mounted for access on the operable side 5 of handset 3. Switch 4 is normally biased outwardly in a position which connects the line circuit for communication and at the same time disconnects the signal circuit to prevent the telephone from ringing when the line circuit is in use. In conventional use, the handset 3 is placed in cradle 6 of telephone body 7 when conversation is finished, with operable side 5 of handset 3 facing the seat 8 of cradle 6. In such position, the push-button 9 of dual function switch 4 bears against the cradle seat 8 and is pushed inwardly to a position which disconnects the line circuit and connects the signal circuit.

The handset 3 also includes station selecting dial mechanism 10. When dual function switch 4 is biased outwardly in the line-connect, signal-disconnect position, the dial mechanism 10 may be operated to dial a desired number and the ear piece 3 then used for communication.

The adjustable band 1 in accordance with this invention enables one to use the telephone and the handset 3 for communication in a location remote from the telephone body 7. It is not necessary to return the handset 3 to cradle 6 when communication is finished. Instead, a detent member 11 provided at an intermediate point of band 1, and facing radially inward thereof when band 1 is secured, is placed in registration with push-button 9 of dual function switch 4. The ends 12 and 13 of band 1 are then fastened together, tightening band 1 around tubular portion 2 of the ear piece 3 and causing detent member 11 to press push-button 9 of switch 4 inwardly to its line-disconnect, signal-connect position. When the ends 12 and 13 of band 1 are secured to hold band 1 in such tightened position, detent member 11 continues to hold push-button 9 of switch 4 in such position until it is desired to use the handset again for communication.

Figure 2:
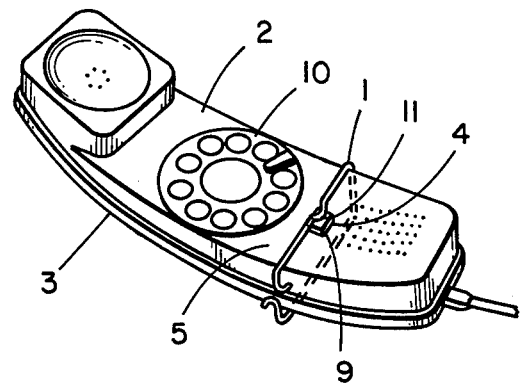
FIG. 2 is a perspective view of the handset of FIG. 1 with a switch retaining device in accordance with this invention thereon and with the dual function switch shown in its released line-connected, signal-disconnected position.
Figure 3:
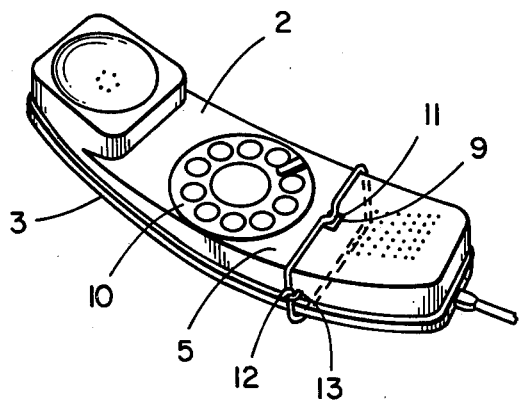
FIG. 3 is a perspective view of the handset and switch retaining device shown in FIG. 2, but with the switch retaining device depressing the dual function switch to its line-disconnect, signal-connect position.

FIG. 2 illustrates one embodiment of the switch retaining device according to this invention, comprising a stiffly resilient wire frame 1 bent to correspond with the cross-sectional shape and dimension of intermediate portion 2 of ear piece 3. Detent member 11 is formed by a bend of the wire frame 1 at an intermediate point which lies in registration with push-button 9 when in place on the handset 3. The ends 12 and 13 are formed to provide corresponding hooks, which may be hooked together when wire frame 1 is squeezed together to bear more closely against the adject portions of intermediate portion 2. In such position detent member 11 bears against push-button 9 forcing it inwardly to the line-disconnect, signal-connect position of switch 4. A signal may now be transmitted through the signal circuit to handset 3 whereupon the ends 12 and 13 may be unhooked thus releasing outwardly biased push-button 9 enabling switch 4 to move to the line-connect, signal-disconnect position.

Figure 4:
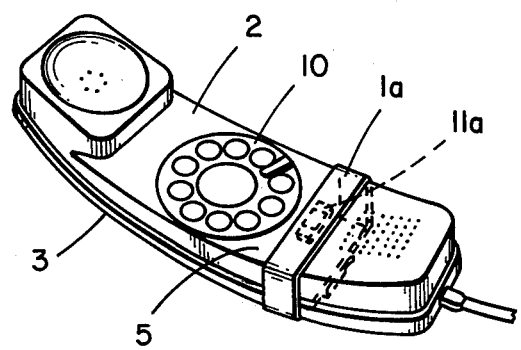
FIG. 4 is a perspective view of the handset of FIG. 1 with a modified switch retaining device thereon depressing the dual function switch to its line-disconnect, signal-connect position.
Figure 5:
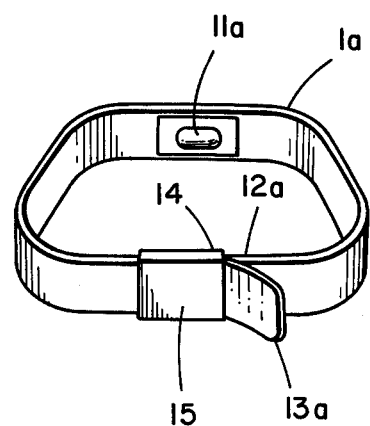
FIG. 5 is a perspective view of the modified switch retaining device shown in FIG. 4.
Figure 6:
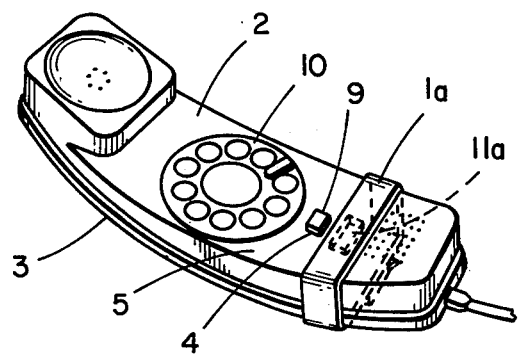
FIG. 6 is a perspective view of the handset and modified switch retaining device shown in FIG. 4, but with the switch retaining device adjustably moved to a release position and with the dual function switch in its line-connect, signal-disconnect position.

FIG. 4 illustrates a modified form of the invention, comprising a flexible band 1a having a projecting solid disk 11a mounted at an intermediate location of band 1a, facing radially inwardly thereof in registration with push-button 9 when band 1a is secured together on intermediate portion 2 of handset 3. End 12a of band 1a is fixedly attached to end 14 of adjustable buckle 15, and the free end 13a of band 1a is drawn through buckle 15 for tightening and retention when tightened. In such tightened position, the solid disk 11a bears against push-button 9 to hold dual function switch 4 in the line-disconnect, signal-connect position.

The flexible band 1a may be of fabric material, or of flexible plastic. The ends 12a and 13a may be secured together by snaps or other known fastening means. The adjustable buckle 15 enables loosening band 1a sufficiently to release push-button 9 so switch 4 may move to the line-connect, signal-disconnect position, but without removing band 1a from the intermediate portion 2 of handset 3. When snap fasteners are used in accordance with this invention, corresponding snaps are positioned on ends 12a and 13a to provide two snapped together positions, one in which band 1a is held tightly against intermediate portion 2 and the solid disk 11a holds push-button 9 of switch 4 inwardly in the line-disconnect, signal-connect position, and one in which band 1a is held loosely around intermediate portion 2 enabling switch 4 to move outwardly to its line-connect, signal-disconnect position.

The switch retaining device in accordance with this invention does not therefore need to be removed from the handset, but remains thereon for both of said switch positions.

Figure 8:
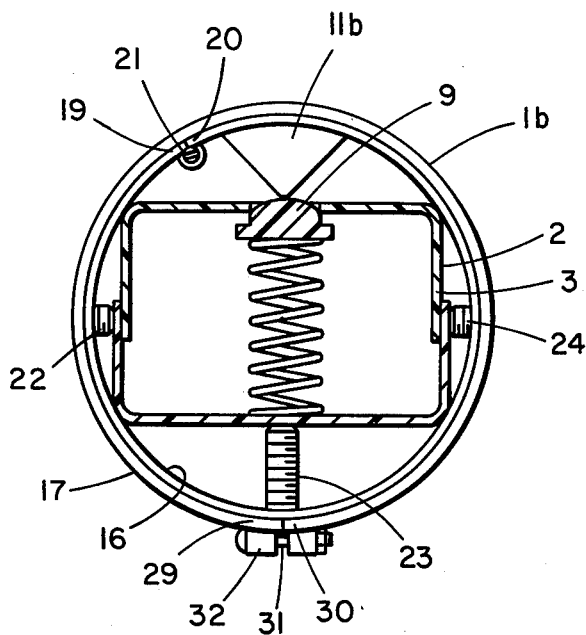
FIG. 8 is a section view as in FIG. 7, but with the switch retaining device adjusted to its engaged position and with the dual function switch moved to its line-disconnect, signal-connect position.
Figure 7:
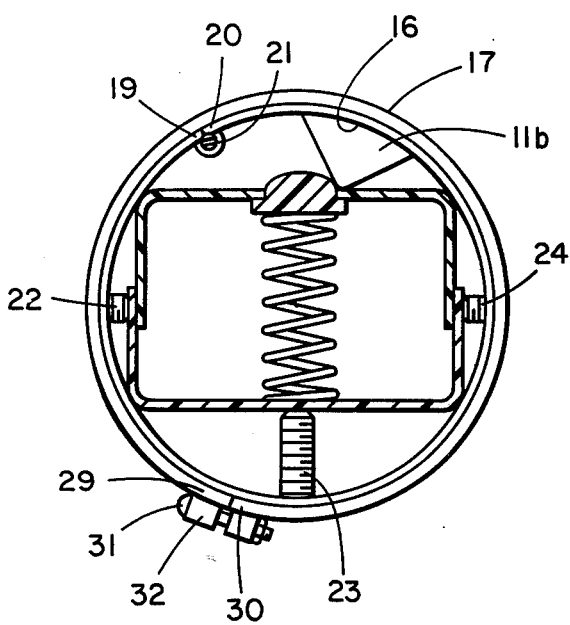
FIG. 7 is a section view of the intermediate portion of an handset of the type shown in FIG. 1, with another modification of a switch retaining device in accordance with this invention mounted thereon and adjusted to its release position with the dual function switch in its line-connect, signal-disconnect position.
Figure 9:
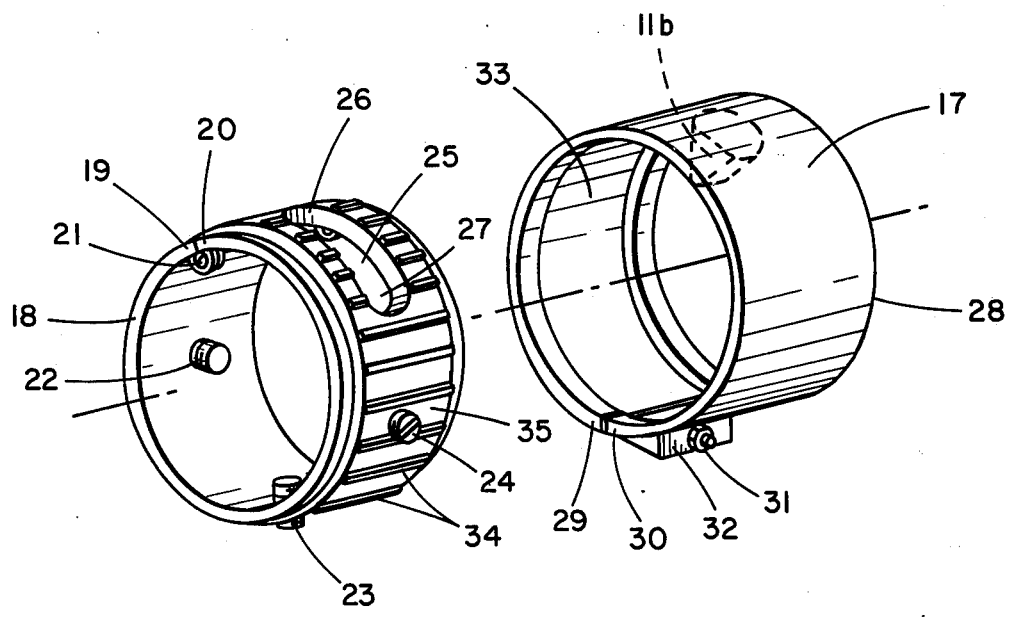
FIG. 9 is a perspective exploded view of the modified switch retaining device illustrated in FIGS. 7 and 8.

FIGS. 7 – 9 illustrate still another modification of this invention, comprising a two-piece band member 1b. The two-piece band member comprises a mounting ring 16 and an adjustable ring 17 mounted over the mounting ring 16 for limited rotation thereon between a switch released position as shown in FIG. 7 and a switch engaged position as shown in FIG. 8.

Mounting ring 16 includes a cylindrical wall 18, having ends 19 and 20 held together by screws 21 through corresponding flanges on each end having apertures in registration to receive screws 21 therethrough. The ring 16 may be mounted on intermediate section 2 of handset 3 by spreading the ends apart to receive intermediate section 2 through the gap, and then securing the ends 19 and 20 as stated above. Three positioning screws 22, 23 and 24 are provided through internally threaded apertures of the cylindrical wall 18 to bear against spaced apart portions of intermediate member 2 and thereby secure mounting ring 16 around intermediate member 2 of the handset 3.

Mounting ring 16 includes a slot 25 therein extending from a location 26 (in registration with push-button 9 when mounted in place on intermediate member 2) to a location 27 out of registration with push-button 9.

Adjustable ring 17 includes cylindrical wall 28, having ends 29 and 30 held together by a bolt 31 through the aligned channels of clamp 32. A detent member 11b is mounted to project inwardly from the inner surface 33 of cylindrical wall 28 of ring 17. Detent member 11b is received in slot 25 of mounting ring 16 when adjustable ring 17 is mounted for rotation thereon. Detent member 11b moves in slot 25 between said locations 26 and 27 by corresponding rotation of ring 17 on mounting ring 16 between such positions.

The ends 29 and 30 of adjustable ring 17 may be spread apart to mount it on mounting ring 16. Bolt 31 is then tightened to draw ends 29 and 30 together sufficiently for a snug fit of ring 17 on mounting ring 16 but loose enough to permit ring 17 to rotate on ring 16 and carry detent member 11b between said locations 26 and 27.

Mounting ring 16 includes spaced apart cross-ribs 34 extending laterally across outwardly facing surface 35 of cylindrical wall 18. Such ribs 34 are preferably resilient, to provide spaced apart resilient contact points with inner surface 33 of cylindrical wall 28 of rotatable ring 17 when mounted on mounting ring 16. Such cross-ribs thereby tend to resiliently hold ring 17 in the position to which it is rotated relative to mounting ring 16.

When detent member 11b of ring 17 is moved to location 26 in slot 25 of ring 16, it is in registration with push-button 9 which is thereby depressed moving dual function switch 4 to its line-disconnect, signal-connect position. When ring 17 is rotated to move detent member 11b to location 27 in slot 25, push-button 9 is released enabling switch 4 to move to its line-connect, signal-disconnect position. The surface 36 of detent member 11b is preferably conical to enable it to engage the corresponding contact edge of push-button 9 and force it inwardly as detent member 11b is moved from out-of-registration location 27 to the in-registration location 26.

I claim:

1. A switch retaining device for telephones comprising band means, said band means includes a wire frame member, said wire frame member being shaped to correspond with the cross-sectional shape and dimension of a portion of said telephone which carries a switch to be retained by said device, said wire frame member including detent means formed by a bend of said wire frame member inwardly of the area surrounded by said wire frame member, said wire frame member being stiffly resilient, said wire frame member including first and second ends, said first and second ends including fastening means, said first and second ends being manually moveable towards each other for fastening engagement in a first position, said first and second ends being movable away from each other by the bias of said stiffly resilient wire frame member to a second position when unfastened and released.

2. A switch retaining device as set forth in claim 1, wherein said fastening means includes co-operative hooks formed on said first and second ends of said wire frame member.

3. A switch retaining device for telephones comprising band means, said band means includes a flexible strip member having first and second ends, fastening means associated with said first and second ends to fasten said flexible strip member together forming a loop, said flexible strip member including detent means including a relatively thick inflexible member mounted on said flexible strip member to project inwardly of said loop when said ends are fastened together.

4. A switch retaining device as set forth in claim 3, wherein said flexible strip member is made of fabric material.

5. A switch retaining device as set forth in claim 3, wherein said flexible strip member is made of plastic sheet material.

6. A switch retaining device for telephones comprising band means, said band means includes a first annular ring member including means to mount around a portion of said telephone which carries a switch to be retained by said device, a second annular ring member being mounted for rotation over and coaxially with said first annular ring member, detent means being carried by said second annular ring member and including a projecting member which projects inwardly toward the central axis of said coaxially mounted ring members, slot means in said first annular ring member to receive said projecting member carried by said second annular ring member therethrough for movement between a first position and a second position, said second annular ring member being manually rotatable on said first annular ring member to move said projecting member between said first and second positions.

7. A switch retaining device as set forth in claim 6, including respective facing surfaces of said first and second annular ring members, friction increasing means mounted on at least one of said facing surfaces to frictionally restrain said ring members from relative rotational movement therebetween and to hold said second annular ring member in the position to which it is manually rotated.

8. A switch retaining device as set forth in claim 7, wherein said friction increasing means includes a resilient cross-rib extending laterally across said one facing surface on which said friction increasing means is mounted.

* * * * *